United States Patent
Yang et al.

(10) Patent No.: US 9,081,234 B2
(45) Date of Patent: Jul. 14, 2015

(54) LIQUID CRYSTAL PANEL

(71) Applicant: Shanghai Tianma Micro-Electronics Co., Ltd., Shanghai (CN)

(72) Inventors: Kang Yang, Shanghai (CN); Tianyi Wu, Shanghai (CN); Hao Chen, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 83 days.

(21) Appl. No.: 14/080,738

(22) Filed: Nov. 14, 2013

(65) Prior Publication Data
US 2014/0176884 A1    Jun. 26, 2014

(30) Foreign Application Priority Data
Dec. 26, 2012  (CN) .......................... 2012 1 0575305

(51) Int. Cl.
| | |
|---|---|
| G02F 1/136 | (2006.01) |
| G02F 1/1339 | (2006.01) |
| G02F 1/1362 | (2006.01) |
| G02F 1/1335 | (2006.01) |
| G02F 1/1345 | (2006.01) |
| G02F 1/161 | (2006.01) |

(52) U.S. Cl.
CPC .......... *G02F 1/1339* (2013.01); *G02F 1/13454* (2013.01); *G02F 1/133512* (2013.01); *G02F 1/136209* (2013.01); *G02F 1/161* (2013.01)

(58) Field of Classification Search
CPC .................... G02F 1/133512; G02F 1/136209
See application file for complete search history.

(56) References Cited

U.S. PATENT DOCUMENTS

2006/0012735 A1* 1/2006 Yamada et al. ............... 349/110

\* cited by examiner

*Primary Examiner* — Phu Vu
(74) *Attorney, Agent, or Firm* — Kilpatrick Townsend & Stockton LLP

(57) ABSTRACT

A liquid crystal panel includes a TFT (Thin Film Transistor) substrate, a CF (Color Filter) substrate and liquid crystal layer arranged between the TFT substrate and the CF substrate. The liquid crystal panel includes a display area and a non-display area, the non-display area surrounds the display area, a sealing material coating area is arranged in the non-display area, and a sealing material is arranged in the sealing material coating area to seal the liquid crystal layer between the TFT substrate and the CF substrate. A first black matrix is arranged inside the CF substrate in the non-display area, devices including a metal layer are arranged inside the TFT substrate in the non-display area, and voids are arranged in the first black matrix of the CF substrate corresponding to at least a part of the devices including the metal layer.

12 Claims, 4 Drawing Sheets

---Prior Art---

---Prior Art---

LIQUID CRYSTAL PANEL

CROSS-REFERENCES TO RELATED APPLICATIONS

The present application claims priority to Chinese Patent Application No. 201210575305.6, filed with the Chinese Patent Office on Dec. 26, 2012, the contents of which is incorporated herein by reference in its entirety.

BACKGROUND OF THE INVENTION

In recent years, a Thin Film Transistor Liquid Crystal Display (hereinafter TFT-LCD) has become a display technology across various sizes due to its numerous advantages, and its applications can be found in various fields, e.g., a television, a notebook computer, a monitor, a mobile phone, etc.

The TFT-LCD includes a Thin Film Transistor (hereinafter TFT) substrate and a Color Filter (hereinafter CF) substrate, and a liquid crystal layer interposed between these two substrates. Moreover, the TFT-LCD is divided into a display area and a non-display area, where the non-display area surrounds the display area, and a sealing material is arranged in the non-display area to seal the liquid crystal layer between the TFT substrate and the CF substrate.

In the prior art, there is a cell fabrication process in a flow of assembling the TFT substrate and the CF substrate, where the liquid crystal layer is dropped in advance onto the CF substrate, and the sealing material is coated in the non-display area of the CF substrate, then the TFT substrate and the CF substrate are bonded together, and finally the sealing material is cured to form a liquid crystal cell. Generally, when the TFT substrate and the CF substrate are assembled in an ODF (One Drop Filling) method, the sealing material is cured through ultraviolet (UV) for rapid curing, that is, it is cured by being illuminated with UV. With the UV-cured sealing material, the UV-cured sealing material has the feature of being instantly cured, so contamination arising when the sealing material before being cured contacts with the liquid crystal layer can be controlled to the minimum extent. After the sealing material is cured by UV illumination, the UV-cured sealing material is heated to be further cured for further enhanced adhesion.

Referring to FIG. 1, FIG. 1 is a schematic diagram of a UV curing process on a sealing material of a TFT-LCD in the prior art. As illustrated in FIG. 1, the TFT-LCD includes a CF substrate 102 and a TFT substrate 103; and a sealing material 101 is arranged between the CF substrate 102 and the TFT substrate 103 in a non-display area of the TFT-LCD, a black matrix (simply BM below) 104 is arranged on the inside of the CF substrate 102, and the sealing material 101 is arranged between the BM 104 and the TFT substrate 103.

Since the BM 104 is arranged on the inside of the CF substrate 102 and the BM 104 is a black light-shielding material through which no light can be transmitted, thus the sealing material 101 can only be illuminated with UV 106 from the side of the TFT substrate 103 for UV curing. As illustrated in FIG. 1, since a plurality of metal wires 105 are further arranged on the inside of the TFT substrate 103, the UV 106 can only illuminate in the region without metal wires 105.

If the process of UV curing is not well done, then ions in the sealing material 101 may contaminate liquid crystal layer and other problems of the TFT-LCD will occur, so UV curing process is greatly important for the process of fabricating the TFT-LCD. In order to enable UV 106 to cure the sealing material 101 sufficiently, typically a transmissivity over the TFT substrate 103 in the non-display area is required to be above 50%, that is, the region without metal wires 105 exceeds 50%.

The TFT-LCD further includes a gate driver and a data driver. The driver circuit is costly to produce and can be made in the technology of Amorphous Silicon Gate (ASG) driver in which the TFT-LCD is manufactured by patterning and integrating the gate driver circuit, gate lines and data lines together with thin film transistors on a panel of the TFT-LCD. Since the ASG technology can dispense with a plug-in gate driver circuit on the original panel, it can improve the integration level of the TFT-LCD, reduce the number of external elements and lower a manufacturing cost and thus has been widely applied to the TFT-LCD.

FIG. 2 is a schematic diagram of a TFT substrate with ASGs.

As illustrated in FIG. 2, the TFT substrate includes a display area and a non-display area, and a plurality of gate lines 202 and a plurality of data lines 203 are arranged on the TFT substrate, where the plurality of gate lines 202 and the plurality of data lines 203 intersect with each other to define a plurality of pixel elements located in the display area of the TFT substrate, the plurality of data lines 203 are connected respectively to a data driver 204, and the data driver 204 provides the data lines 203 with a data drive signal sequentially, and the data driver 204 is connected to a printed circuit board 205.

An ASG element 201 is arranged in the non-display area of the TFT substrate, and the ASG element 201 can provide a row of pixel elements connected therewith with a gate drive signal separately. The ASG element 201 is also connected to the printed circuit board 205.

With the ASG technology, since devices in the ASGs occupy a large area, transmissivity of the TFT substrate in the non-display area is greatly lowered, i.e., transmissivity of UV is lowered, so that the sealing material may not be cured sufficiently, and contaminants may be mixed into adjacent liquid crystal layer. Thus, it is desirable to design a liquid crystal panel with a panel space utilized effectively so as to have the sealing material cured sufficiently.

SUMMARY OF THE INVENTION

The invention is intended to address a technical problem of providing a liquid crystal panel with a panel space thereof possibly utilized effectively, so as to have a sealing material cured sufficiently even with an ASG liquid crystal panel.

In view of this, embodiments of the invention provide a liquid crystal panel including:

a TFT substrate, a CF substrate, and liquid crystal layer arranged between the TFT substrate and the CF substrate, wherein:

the liquid crystal panel includes a display area and a non-display area, the non-display area surrounds the display area, a sealing material coating area is arranged in the non-display area, and a sealing material is arranged in the sealing material coating area to seal the liquid crystal layer between the TFT substrate and the CF substrate;

a first black matrix is arranged on the inside of the CF substrate in the non-display area, and devices including a metal layer are arranged on the inside of the TFT substrate in the non-display area; and voids are arranged in the first black matrix of the CF substrate corresponding to at least a part of the devices including the metal layer.

Preferably, the area of the voids is above 50% of the area of the sealing material coating area.

Preferably, the first black matrix overlaps partially with the sealing material coating area, and the voids are arranged in the overlapping area.

Preferably, the area of the voids is above 50% of the area of the overlapping area.

Preferably, a part of the first black matrix close to the display area is an "inboard region", and a part of the first black matrix away from the display area is an "outboard region"; and the sealing material coating area is located in the outboard region of the first black matrix.

Preferably, the sealing material is UV glue and cured by being illuminated with ultraviolet illuminating from the CF substrate side.

Preferably, the width of the first black matrix ranges from 0.8 to 1.6 mm.

Preferably, the width of the sealing material coating area ranges from 500 to 800 μm.

Preferably, the display area further includes a second black matrix including a plurality of openings, and the voids are etched at the same time as the opening, of the second black matrix.

Preferably, the devices including the metal layer are ASG devices.

Preferably, a color blocking layer is arranged at least at a part of the voids in the first black matrix.

Preferably, the color blocking layer is a red color filter.

DESCRIPTION OF THE SPECIFIC EMBODIMENTS

In order to make the foregoing objects, features and advantages of the invention more apparent, embodiments of the invention will be detailed below with reference to the drawings, and obviously, the embodiments described below are only a part but not all of embodiments of the invention. Based upon the embodiments of the invention here, all of other embodiments derived by those skilled in the art without any inventive effort shall be encompassed in the scope of the invention.

First Embodiment

A liquid crystal panel of this embodiment includes a TFT substrate and a CF substrate arranged in opposition; and the liquid crystal panel includes a display area and a non-display area, and the non-display area surrounds the display area, liquid crystal layer is filled in the display area to form a liquid crystal layer, a sealing material coating area is arranged in the non-display area, and a sealing material is arranged in the sealing material coating area to seal the liquid crystal layer between the TFT substrate and the CF substrate; and then the sealing material is cured in a UV curing step in a cell fabrication process to seal and bond the TFT substrate and the CF substrate.

In a practical process, a different cell fabrication process can be selected according to the size of the LCD panel. For example, for the LCD panel with a small size, typically the sealing material is coated on the array substrate, the liquid crystal layer is dropped on the CF substrate, and then the TFT substrate is inverted onto the CF substrate. For the LCD panel with a large size, typically the sealing material is coated on the CF substrate, the liquid crystal layer is dropped on the TFT substrate, and then the CF substrate is inverted onto the TFT substrate.

In this embodiment, the TFT substrate includes a first transparent substrate, and the TFT substrate includes: a display area and a non-display area; gate lines and data lines formed in the display area; and ASG elements formed in the non-display area, each of which is a circuit structure next to each row of pixels to generate a gate drive signal separately. The gate lines are connected with the ASG elements. Metal devices of the ASG elements are formed at the same time as the gate lines and the data lines on the TFT substrate in the display area, that is, the gate driver circuits are patterned and integrated at the same time as the gate lines, the data lines and thin film transistors on the TFT substrate in the non-display area.

Figure 1:
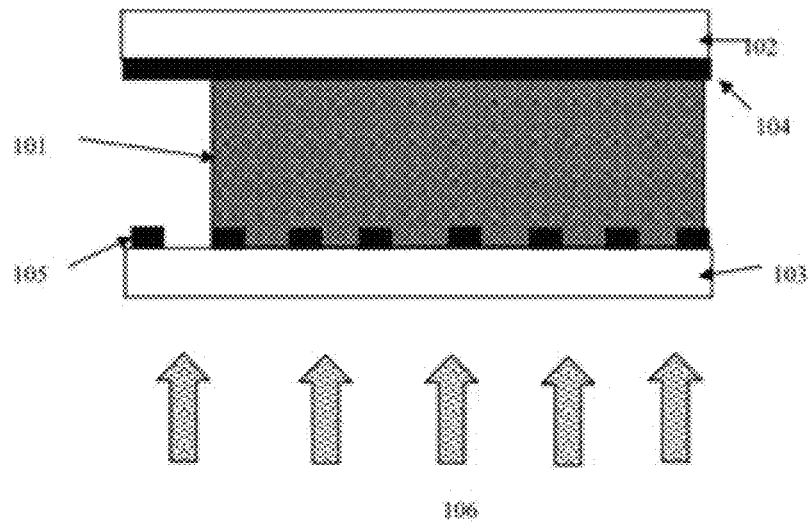
FIG. 1 illustrates a sectional view of a construction in which the sealing material 101 and the BM 104 are coated overlapping with each other and UV illuminates from the side of the TFT substrate.
Figure 2:
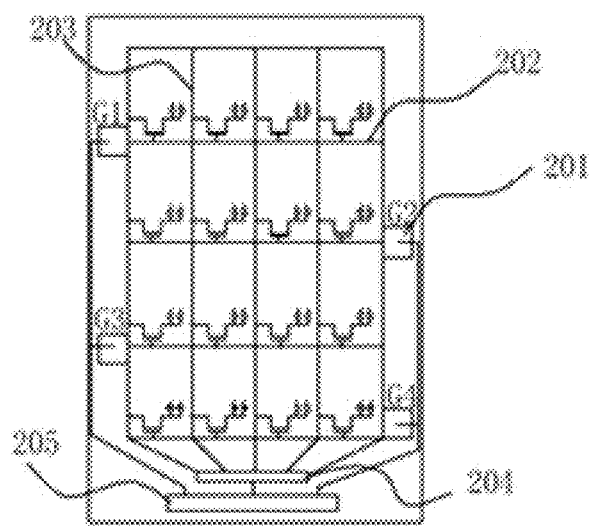
FIG. 2 is a schematic circuit diagram of an ASG TFT panel.
Figure 3:
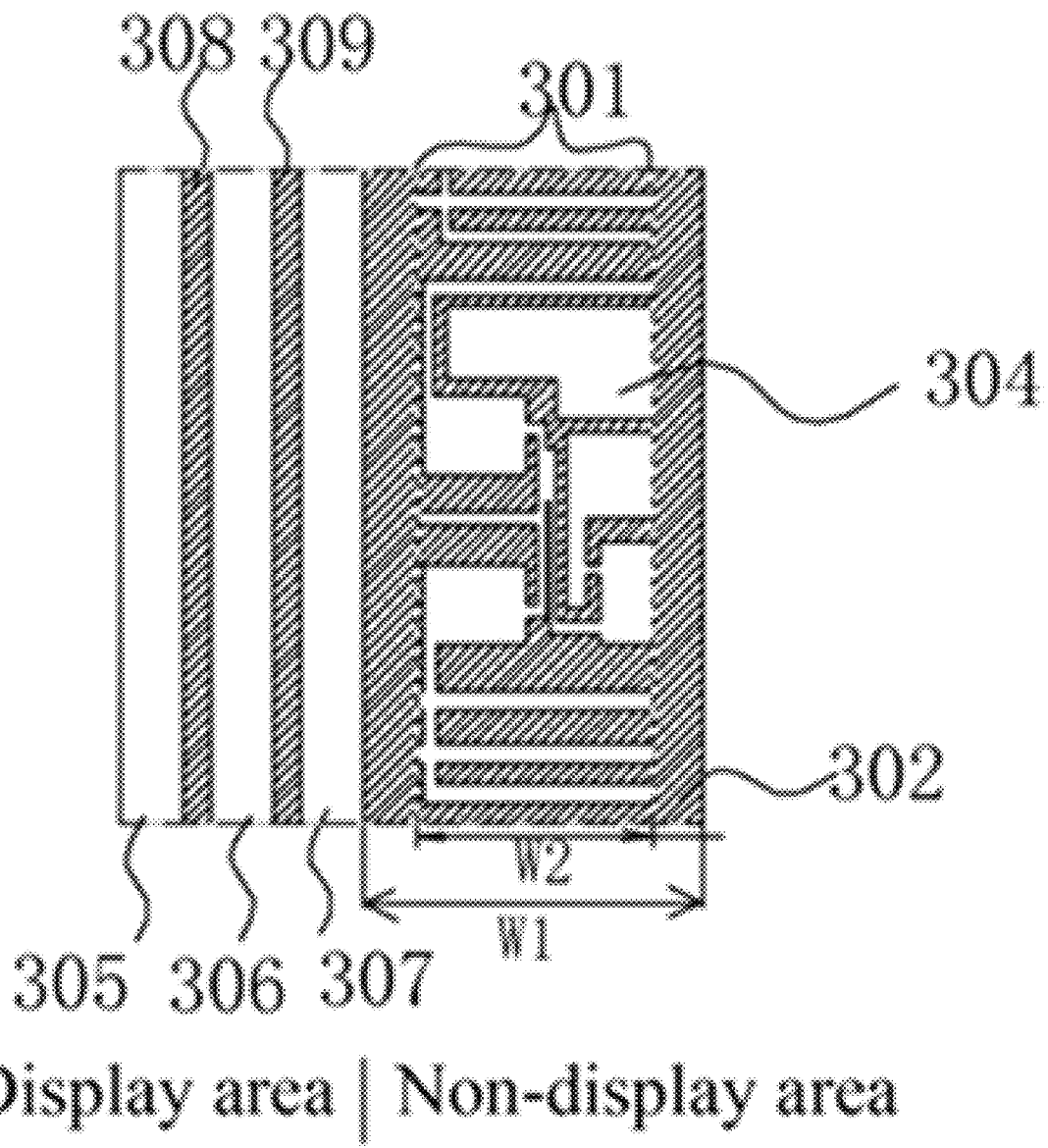
FIG. 3 is a top view of a part of a CF substrate according to an embodiment of the invention.

FIG. 3 is a top view of a part of the CF substrate according to this embodiment. In FIG. 3, the CF substrate includes a second substrate which can be made of a transparent glass material. The CF substrate includes a display area and a non-display area, where the display area of the CF substrate includes a plurality of sub-pixels, and taking each pixel including three sub-pixels as an example, the display area can include a red sub-pixel (R) 305, a green sub-pixel (G) 306 and a blue sub-pixel (B) 307. The display area further includes a second black matrix 308 formed between the red sub-pixel 305 and the green sub-pixel 306 and a second black matrix 309 formed between the green sub-pixel 306 and the blue sub-pixel 307. The red sub-pixel 305, the green sub-pixel 306 and the blue sub-pixel 307 are arranged in an opening between the second black matrixes.

The non-display area of the CF substrate includes a first black matrix 302 and voids 304 in the first black matrix, and a sealing material coating area 301 is arranged in the non-display area of the CF substrate. As apparent from FIG. 3, the sealing material coating area 301 completely overlaps with the first black matrix 302, that is, the sealing material completely overlaps with the first black matrix 302. The first black matrix 302 and the second black matrixes 308, 309 can be formed at the same time, and the voids 304 in the first black matrix and the opening between the second black matrixes can be formed at the same time.

The sealing material (not illustrated) is located between the CF substrate and the TFT substrate, the sealing material coating area 301 completely overlaps with the first black matrix 302, and the width W2 of the sealing material coating area 301 is smaller than or equal to the width W1 of the first black matrix 302, and the width W1 of the first black matrix 302 ranges from 0.8 to 1.6 mm. Preferably, the sealing material coating area 301 is arranged in an outboard region of the first black matrix 302. The sealing material is UV glue. The width W2 of the sealing material coating area 301 ranges from 500 to 800 μm.

The voids 304 are located in the first black matrix 302, overlap with the sealing material coating area 301, and correspond to the metal devices of the ASG elements on the TFT substrate. Particularly, the voids 304 overlap with the metal devices of the ASG elements in the direction transmitting lights. The lights transmitted from the LCD backlight can be shielded by the metal devices or by the first black matrix 302, thereby preventing a light leakage phenomenon. When the UV is transmitted from the CF side, the sealing material is illuminated with the UV through the voids 304 and is cured.

Since the voids 304 correspond to the metal devices of the ASG elements on the TFT substrate in the non-display area, the area of the metal devices of the ASG elements in practical operation can reach approximately 75% of the total area of the sealing material coating area 301, and since the sealing material coating area 301 is the area where the sealing material is located, the total area of the voids 304 can reach approximately 75% of the total area of the sealing material. Since the sealing material can be cured sufficiently when the area of the sealing material illuminated with UV reaches approximately 50% of the total area of the sealing material, the voids 304 corresponding to the metal devices of the ASG elements are arranged in the first black matrix 302 to let UV transmitted through the voids 304 to illuminate the sealing material, thereby having the sealing material cured sufficiently. In this embodiment, the voids 304 can correspond to all the metal devices of the ASG elements on the TFT substrate, but the scope of the invention will not be limited thereto. In another embodiment of the invention, the voids 304 can correspond to a part of the metal devices of the ASG elements on the TFT substrate as long as the accumulated area of the voids 304 is above 50% of the total area of the sealing material. Moreover, since the voids 304 correspond to the metal devices of the ASG elements, when UV are transmitted through the voids 304 to illuminate the metal devices, the metal devices can reflect the UV, thereby having UV illuminating on the sealing material further enhanced and the sealing material further cured.

A part of the first black matrix 302 close to the display area is an "inboard region", and a part of the first black matrix away from the display area is an "outboard region". In this embodiment, the sealing material coating area 301 is arranged in the intermediate region of the first black matrix 302. In another embodiment of the invention, the sealing material coating area can alternatively be arranged in the inbound region or the outbound region of the first black matrix.

According to the embodiment of the invention, the first black matrix on the CF substrate in the non-display area overlaps with the sealing material coating area, and the voids corresponding to the metal devices of the ASG elements are arranged in the first black matrix, thereby achieving the purpose of having the sealing material cured sufficiently.

In this embodiment, it is described by taking the ASG elements arranged on the TFT substrate as an example, in another embodiment of the invention, other devices including the metal layer, e.g., metal cables, etc., can be arranged on the TFT substrate. The voids are arranged at least in the first black matrix of the CF substrate corresponding to a part of the devices including the metal layer, the sealing material can be illuminated with the UV through the voids, thereby achieving the purpose of curing the sealing material.

Second Embodiment

The second embodiment is different from the first embodiment of the invention in that the sealing material coating area overlaps partially with the first black matrix.

Figure 4:
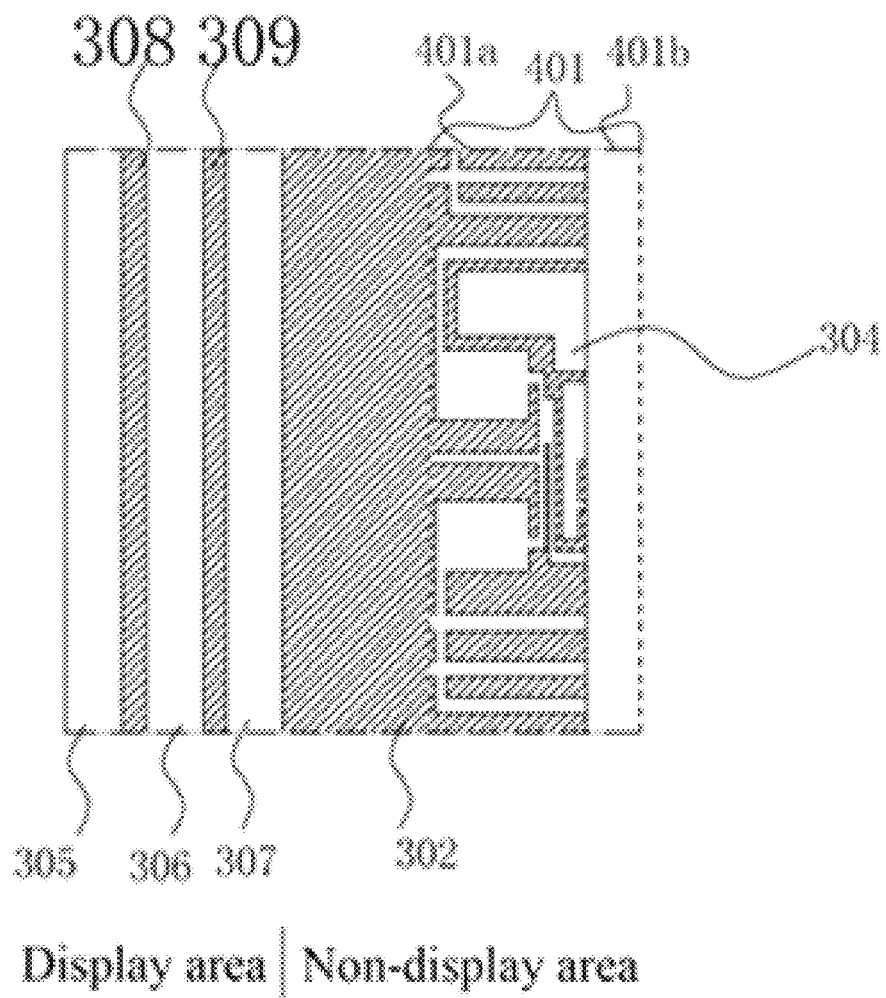
FIG. 4 is a schematic diagram illustrating that a sealing material overlaps with a first black matrix partially.

FIG. 4 is a schematic diagram illustrating that the sealing material coating area overlaps partially with a first black matrix. As illustrated in FIG. 4, the sealing material coating area 401 on the CF substrate is divided into a first part 401*a* overlapping with the first black matrix 302 and a second part 401*b* non-overlapping with the first black matrix 302. The second part 401*b* of the sealing material coating area 401 is arranged on a side of the CF substrate away from the display area. A plurality of voids 304 are arranged in the first black matrix 302 corresponding to the first part 401*a* of the sealing material coating area 401, and the voids 304 correspond to the metal devices of the ASG elements on the TFT substrate. In this embodiment, the total area of the voids 304 is above 50% of the area of the first part 401*a*. When UV is transmitted from the CF substrate side, UV can transmit through the voids 304 to have the sealing material at the first part 401*a* cured sufficiently, and since the second part 401*b* is not shielded by the first black matrix, all the sealing material at the second part 401*b* can be illuminated by UV and thus can be cured sufficiently. Thus in this embodiment, the sealing material can be cured sufficiently.

Third Embodiment

Figure 5:
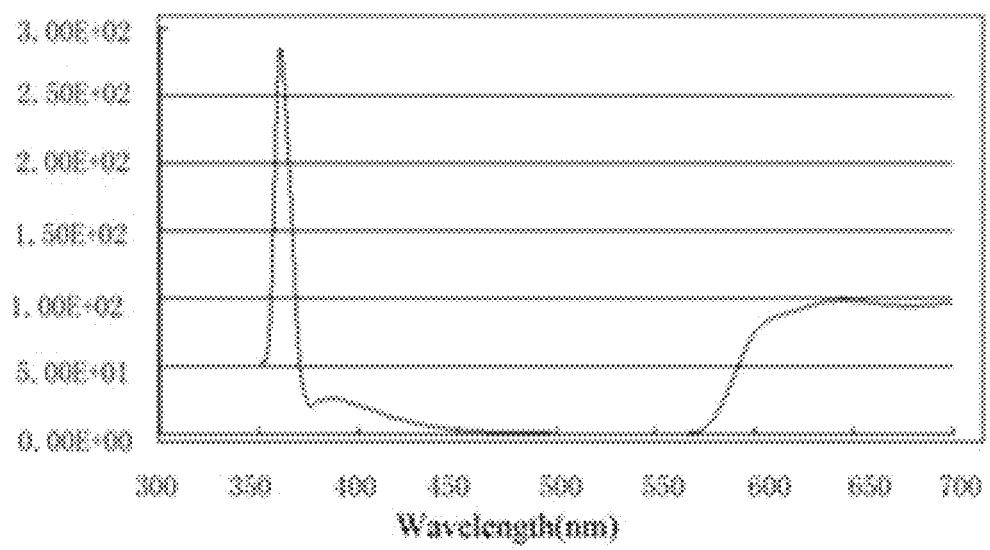
FIG. 5 is a spectrum diagram when a red color filter is used.
Figure 6:
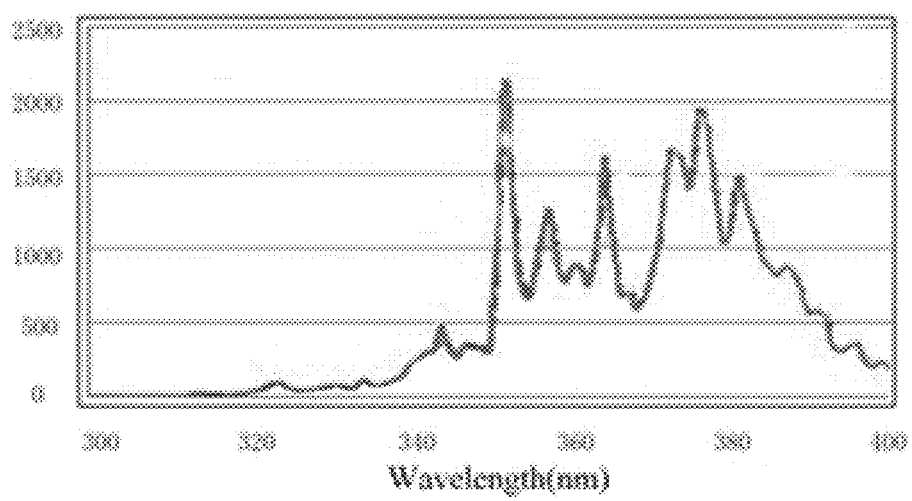
FIG. 6 is a UV spectrum diagram.

The third embodiment is different from the first embodiment of the invention in that a color blocking layer is arranged at the voids in the first black matrix 302, and the color blocking layer can prevent natural light from transmitting through the voids in the first black matrix to illuminate the liquid crystal panel, which resulting in a current leakage phenomenon in ASG channels. The color blocking layer is preferably a red color filter, and FIG. 5 is a spectrum diagram of UV and visible light when a red color filter is used. As illustrated in FIG. 5, the horizontal axis represents a light wavelength, and the vertical axis represents light energy transmitted through the red color filter. The wavelength of UV ranges approximately from 330 to 400 nm, the wavelength of red light ranges approximately from 600 to 700 nm, the wavelength of blue light ranges approximately from 435 to 450 nm, and the wavelength of green light ranges approximately from 492 to 577 nm. As apparent from FIG. 5, with the red color filter, UV and red light can transmit but blue light and green light cannot transmit, and the visible light can be shielded by approximately two thirds, thus lowering the current leakage phenomenon in the ASG channels. FIG. 6 is a spectrum diagram of UV without a color blocking layer tested in the practical operation. As apparent from FIG. 6, the wavelength of UV ranges from 350 to 380 nm. As apparent from FIG. 5 and FIG. 6, the transmissivity of UV is substantially not influenced by the addition of the red color filter, so the red color filter can be arranged at the voids in the first black matrix in this embodiment, thereby lowering the transmissivity of the visible light and consequently lowering the current leakage phenomenon in the ASG channels; and also the transmissivity of UV is not influenced, thus ensuring curing of the sealing material. The technical solution of the invention will not be limited thereto, and in another embodiment of the invention, other color blocking layer, e.g., a green color filter or a blue color filter, can alternatively be arranged on the voids in the first black matrix, thereby equally achieving the effect of shielding the visible light and letting UV to transmit, furthermore, other protection layer can be arranged on the voids in the first black matrix as long as the purpose of shielding the visible light and letting UV to transmit can be achieved.

In summary, the invention provides a liquid crystal panel, when the ASG technology is used, voids corresponding to metal devices of ASG elements are arranged in a first black matrix on the liquid crystal panel in a non-display area, and the voids are located in a region of the first black matrix overlapping with a sealing material, and upon illumination from the CF substrate side, UV transmits through the voids in the first black matrix to have the sealing material cured sufficiently while narrowing a frame.

The foregoing description is merely illustrative of preferred embodiments of the invention but not intended to limit the invention in any form. Although the invention has been disclosed in the preferred embodiments, numerous possible variations and adaptations can be made to the technical solution of the invention or the preferred embodiments can be modified to equivalent embodiments with equivalent variations in light of the method and technical disclosure above without departing from the scope of the technical solution of the invention. Accordingly any apparent modifications, equivalent variations and adaptations made to the foregoing embodiments in light of the technical solution of the invention shall be encompassed in the claimed scope of the technical solution of the invention.

What is claimed is:

1. A liquid crystal panel, comprising:
a TFT (Thin Film Transistor) substrate, a CF (Color Filter) substrate, and liquid crystal layer arranged between the TFT substrate and the CF substrate, wherein:
the liquid crystal panel comprises a display area and a non-display area, the non-display area surrounds the display area, a sealing material coating area is arranged in the non-display area, and a sealing material is arranged in the sealing material coating area to seal the liquid crystal layer between the TFT substrate and the CF substrate;
a first black matrix is arranged on the inside of the CF substrate in the non-display area, and devices comprising a metal layer are arranged on the inside of the TFT substrate in the non-display area; and
voids are arranged in the first black matrix of the CF substrate corresponding to at least a part of the devices comprising the metal layer.

2. The liquid crystal panel according to claim 1, wherein the area of the voids is above 50% of the area of the sealing material coating area.

3. The liquid crystal panel according to claim 1, wherein the first black matrix overlaps partially with the sealing material coating area, and the voids are arranged in the overlapping area.

4. The liquid crystal panel according to claim 3, wherein the area of the voids is above 50% of the area of the overlapping area.

5. The liquid crystal panel according to claim 1, wherein a part of the first black matrix close to the display area is an "inboard region", and a part of the first black matrix away from the display area is an "outboard region"; and wherein the sealing material coating area is located in the outboard region of the first black matrix.

6. The liquid crystal panel according to claim 1, wherein the sealing material is UV glue and cured by being illuminated with ultraviolet illuminating from the CF substrate side.

7. The liquid crystal panel according to claim 1, wherein the width of the first black matrix ranges from 0.8 to 1.6 mm.

8. The liquid crystal panel according to claim 1, wherein the width of the sealing material coating area ranges from 500 to 800 μm.

9. The liquid crystal panel according to claim 1, wherein the display area further comprises a second black matrix comprising a plurality of openings, and the voids are etched at the same time as the openings of the second black matrix.

10. The liquid crystal panel according to claim 1, wherein the devices comprising the metal layer are ASG (Amorphous Silicon Gate) devices.

11. The liquid crystal panel according to claim 1, wherein a color blocking layer is arranged at least at a part of the voids in the first black matrix.

12. The liquid crystal panel according to claim 11, wherein the color blocking layer is a red color filter.

* * * * *